(12) United States Patent
Omote

(10) Patent No.: US 8,743,125 B2
(45) Date of Patent: Jun. 3, 2014

(54) METHOD AND APPARATUS FOR PROVIDING NATURAL FACIAL ANIMATION

(75) Inventor: Masanori Omote, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 842 days.

(21) Appl. No.: 12/399,766

(22) Filed: Mar. 6, 2009

(65) Prior Publication Data

US 2009/0231347 A1 Sep. 17, 2009

Related U.S. Application Data

(60) Provisional application No. 61/035,714, filed on Mar. 11, 2008.

(51) Int. Cl.
*G06T 13/00* (2011.01)
(52) U.S. Cl.
USPC .......................... 345/473; 345/474; 345/475
(58) Field of Classification Search
None
See application file for complete search history.

(56) References Cited

U.S. PATENT DOCUMENTS

| | | | |
|---|---|---|---|
| 5,657,426 A * | 8/1997 | Waters et al. | 704/276 |
| 6,539,354 B1 * | 3/2003 | Sutton et al. | 704/260 |
| 6,661,418 B1 | 12/2003 | McMillan et al. | |
| 2003/0137515 A1 * | 7/2003 | Cederwall et al. | 345/473 |
| 2005/0057570 A1 | 3/2005 | Cosatto et al. | |
| 2006/0009978 A1 | 1/2006 | Ma et al. | |
| 2006/0012601 A1 | 1/2006 | Francini et al. | |
| 2009/0153552 A1 * | 6/2009 | Fidaleo et al. | 345/419 |
| 2010/0094626 A1 * | 4/2010 | Li et al. | 704/234 |

OTHER PUBLICATIONS

Kawamoto, S. et al; "Key-frame Removal Method for Blendshape-based Cartoon Lip-sync"; Aug. 2006; ACM SIGGRAPH 2006, Boston.

* cited by examiner

*Primary Examiner* — Ke Xiao
*Assistant Examiner* — Weiming He
(74) *Attorney, Agent, or Firm* — Martine Penilla Group, LLP

(57) ABSTRACT

Natural inter-viseme animation of 3D head model driven by speech recognition is calculated by applying limitations to the velocity and/or acceleration of a normalized parameter vector, each element of which may be mapped to animation node outputs of a 3D model based on mesh blending and weighted by a mix of key frames.

20 Claims, 2 Drawing Sheets

METHOD AND APPARATUS FOR PROVIDING NATURAL FACIAL ANIMATION

CROSS-REFERENCE TO RELATED APPLICATIONS

This application claims priority to U.S. Provisional Patent Application Ser. No. 61/035,714, filed 11 Mar. 2008, which application is incorporated herein in its entirety by this reference thereto.

FIELD OF THE INVENTION

Embodiments of this invention relate to computer graphics and animation. More particularly, embodiments of this invention relate to facial animation driven by speech recognition.

BACKGROUND OF THE INVENTION

It is desirable to show movement of the face during speech, for example on the face of an avatar or a character in a game, such as a game played on a game console, for example Sony's PS3. In such application, the speech could be that of the user, or it could be prerecorded speech. Unfortunately, when facial animation is driven by speech recognition, the appearance of the face tends to be unnatural.

A technique, referred to as lip-synch, is often used in animated movies, such as those produced by Pixar and Dreamworks. In such movies, it is necessary to move the mouth and/or other facial features of characters according to the character's speech. Animation of the mouth and other facial features is typically accomplished by drawing those features by hand.

The current state of the art also uses a speech recognition engine to analyze the phonemes contained in the character's speech. This results in a sequence of phonemes. Each such sequence can be bound to a typical face shape for that phoneme. For purposes of the discussion herein, these face shapes are referred to as visemes (see, for example, *Information on converting phonemes to visemes (visual display)*, Annosoft, LLC, www.annosoft.com/phonemes.html). Thus, a particular viseme is the shape of the face for a particular phoneme. For example, if a character says the phoneme that produces the "ee" viseme, then the character's face is given a specific, corresponding shape. Animated speech involves displaying a sequence of visemes that correspond to the phonemes contained in such speech.

Face shape for these visemes can be created in various ways. One such technique is mesh-morphing, e.g. where a mesh of 3D points is controlled by a set of conformation and expression parameters, in which the former group controls the relative location of facial feature points such as eye and lip corners, where changing these parameters can re-shape a base model to create new heads, and in which the latter group of parameters (expression) are facial actions that can be performed on face such as stretching lips or closing eyes; and another such technique is bone skinning, e.g. animation in which a character is represented in two parts: a surface representation used to draw the character (called the skin) and a hierarchical set of bones used for animation only (called the skeleton). To animate a 3-D model, one or both of these techniques is used to move the facial mesh.

If mesh-morphing is used, the morph target is morphed to a key frame. Thus, if the facial expression is the "ee" face and the next time frame output is "oo," then the facial expressions are animated to transition from one to the other to give the impression of speech. In mesh-morphing, the weighting factor for each morph target is modified to make a transition from "ee" to "oo." In mesh-morphing, there may be a base target of, for example, a character's face. In this case, the face should have some morph target, which is a mesh that is blended with a base target to transition from one facial expression to the other. If a weighting factor used to blend the base target with the morph target is set at one for "ee" and zero for "oo," then the final face should be "ee." If the weighting factor is set at zero and one, the final face should show "oo." If the weighting factor is set at half and half, then the facial expression should be "eh," which is in between "ee" and "oo". Thus, it is possible to modify the weighting factors for the key frame, i.e. the designated pose or shape of this face, and make a smooth transition between facial expressions in accordance with speech.

The weight could be modified gradually, or it could be modified more quickly, depending on how quickly the transition occurs. One difficulty is that it is possible to change, for example, zero-one to one-zero, and the face would change from one shape to another in only one frame. However, changing the face in this way produces a change of expression that is jerky and unnatural. Thus, the weights should be chosen to make a smooth transition. While linear interpolation would work to create a smooth transition, the quality of the transition is not natural, such that there is presently no practical technique that allows for smooth, natural transitions in connection with mesh morphing.

Bone skinning, uses a kind of joint to move a partial mesh to make a particular kind of facial expression and can be useful also for creating visemes. In this case, every joint has some weighted parameters that are used for transitions. A set of parameters can create visemes, e.g. for "ee" or "oo." As the joints move, they pull on the mesh and change the shape of the face.

Another basic problem with the use of facial animation to show speech concerns the speech recognition results themselves, which are a time series of phonemes and, as such, are compressed somewhat. For example, if a character says "I," then the time series of the speech recognition results should be "a-a-a-a," and at some point "e-e-e-e." This is the ideal case. In the real world, the result is different. A person would say, "a-a-a-a" and some "oo" and some "e-e-e-e" and other sounds in between for a very short time. If the speech recognition result is followed in the facial animation, the face moves unnaturally fast and sometimes jumps, for example because there is an unintended phoneme in the middle of the transition from one intended phoneme to the other intended phoneme that is passed through during the transition. This is an artifact of speech, but the system tracks it nonetheless and moves the face for that phoneme as well, creating an unnatural movement in the face.

One approach to solving this problem is taught in *Keyframe Removal Method for Blendshape-based Cartoon Lipsync Animation*, Shin-ichi Kawamoto et al. SIGGRAPH 2006. The basic idea in this teaching is to take the average vertex movement speed and remove key frames. Thus, the key frames are based on the vertex movement speed. Whether this technique may improve the appearance of an animated face during phoneme transitions is not known at this time, although it is thought that this approach would require substantial time to calculate average vertex movement speed if it were to be implemented naively.

Clearly, there is a need in the art for a technique that provides natural looking facial animation driven by speech recognition.

SUMMARY OF THE INVENTION

The disadvantages associated with the prior art are overcome by embodiments of the present invention directed to a technique for providing natural looking facial animation driven by speech recognition.

An embodiment of the invention provides a method and apparatus for calculating natural inter-viseme animation of 3D head model driven by speech recognition. This may be accomplished by applying limitations to the velocity and acceleration of a normalized parameter vector, each element of which is mapped to animation node outputs of a 3D model based on mesh blending and weighted by a mix of key frames.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
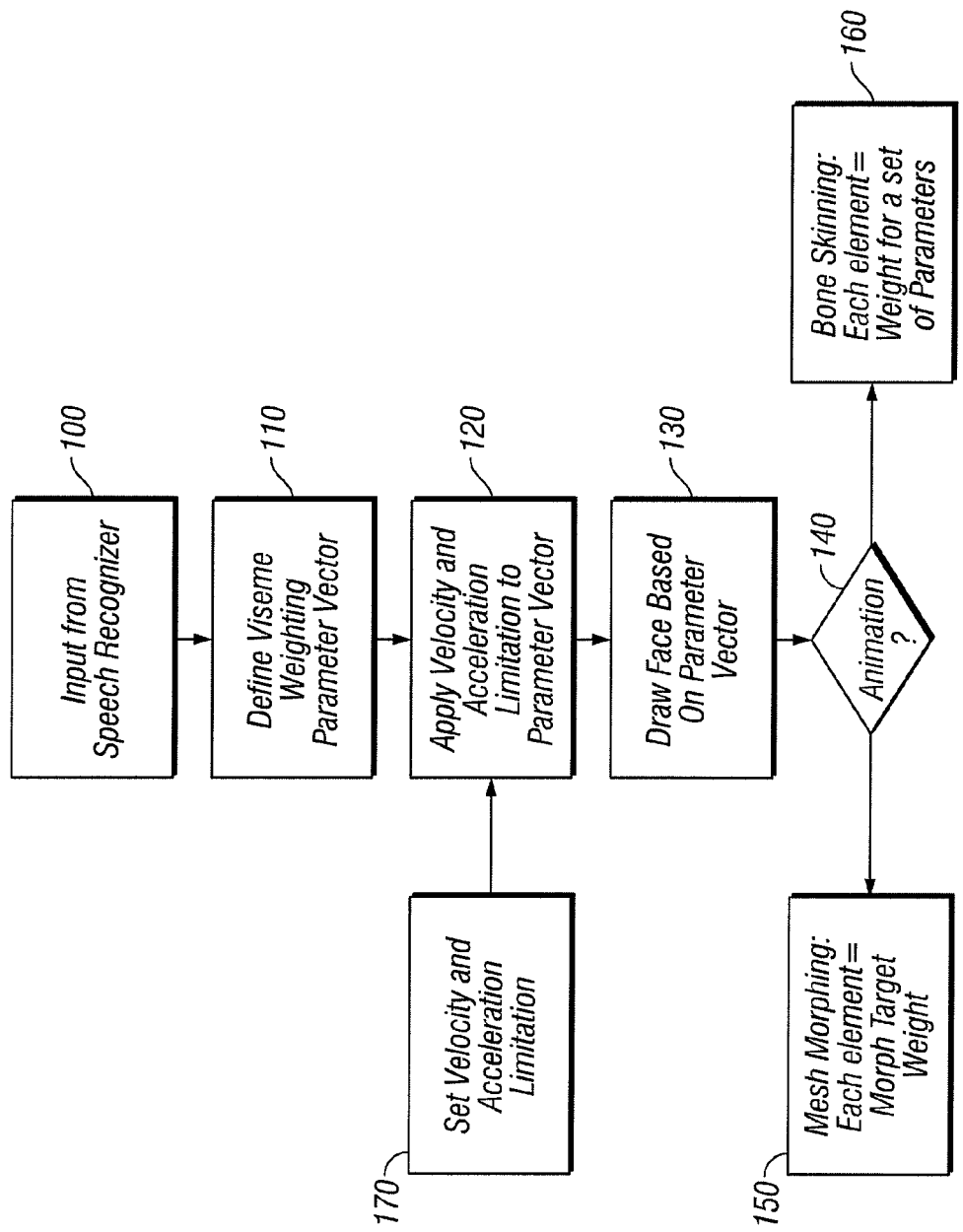
FIG. 1 is a flow diagram showing a facial animation algorithm according to an embodiment of the invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

An embodiment of the invention provides a method and apparatus for calculating natural inter-viseme animation of 3D head model driven by speech recognition. This may be accomplished by applying limitations to the velocity and acceleration of a normalized parameter vector, each element of which may be mapped to animation node outputs of a 3D model, based on mesh blending and weighted by a mix of key frames.

An advantage of the invention is that it addresses errors that are introduced by the speech recognizer. There are many such errors that occur during speech recognition. For example, if one says "I," then some part of that sound is "ah", that should be "ah," and another part is "ee," but it could also include the "oo" or "ay." sound as well. Rather than remove key frames as in the prior art, the invention accepts all of the speech recognition results. When making a desired transition from one viseme to another the inventive technique does not produce an facial expression that is pulled by an error because velocity and acceleration of the facial features are set by the parameter vector, which limits how much in any direction the face moves before it goes back to an intended direction. Due to this damping effect, the face can not be pulled all the way over to display an expression of an error.

A further advantage of the invention is that it mediates the speed at which a transition occurs from one point to another point. Facial expressions should change in a way that appears to be natural, such that the face does not move in an exaggerated way. The invention makes this transition occur at a speed that more accurately models the facial muscles. Facial motion unnaturalness is typically caused by the unnatural speed of the motion of facial features during phoneme transitions, as discussed above. It is not recognized in the art that that such motion is driven by muscle force, which gives acceleration. An embodiment of the invention concerns the limitation of velocity and/or acceleration in a normalized parameter vector that is applied to the vertices in a face model.

For purposes of an embodiment of the invention, a normalized parameter vector comprises a number of rates that shows the contribution of each viseme or phoneme, described below in Table 1. This parameter vector is referred to in the "viseme point" herein.

For each frame or update of the face shape, this viseme point moves to the current viseme if the viseme point does not match the current viseme. The limitation to the velocity and/or acceleration is placed on this move of the viseme point. This update procedure can be explained as following pseudocode:

```
{
    raw_accel = calculate_acceleration(current_phoneme);
    accel = limit_acceleration(raw_accel);
    raw_velocity = calculate_velociry(accel);
    velocity = limit_velocity(raw_velocity);
    viseme_point = calculate_vector(velocity);
}
```

In this code, calculate_(factor) calculates (factor), and limit_(factor) produces an actual parameter of (factor), based on the limitation which is set outside of this part.

Thus, an embodiment of the invention provides a mechanism that shows, for example a character or an avatar, in which facial motion of the character or avatar is driven by speech recognition. Applications of the invention can include, for example, video games, chat software, video communication devices, telephones, ATMs having a video screen, robots, digital photo frames, and so on.

FIG. 1 is a flow diagram showing a facial animation algorithm according to an embodiment of the invention. An embodiment of the invention accepts all results from speech recognition (100). This means such results include some errors, as discussed above. Thus, an embodiment defines a viseme weighting parameter vector (110), in which each element stands for the weight of one viseme. The appearance of the viseme is affected by the actual speed and amount of facial movement imparted, for example via a mesh morph or bone skinning technique, or combination thereof, based upon a weight that is applied to the viseme (120). For example, consider the case where the morph target shows a viseme that corresponds to a speech element, e.g. the viseme for the phoneme "ee." The parameter vector is applied to the viseme to accomplish mesh-morphing in this example. This applies to the weight for the viseme for "ee." In an embodiment, a limitation may be applied to both the velocity and acceleration components of the parameter vector. This limitation on velocity and acceleration provides a transition between visemes that models what happens when the face really moves. Such movement is not a digital movement, but is more gradual and natural. In contrast to the prior art, the invention does not calculate the vertex movement speed, but controls any of the velocity and acceleration in connection with transitions between visemes.

After calculating the parameter vector, the face is drawn based on that vector (130). If mesh-morphing is used, each element represents a weight for a morph (150). If bone skinning is used, each element represents a weight for several parameters to create the shape of the viseme (160). In both cases, this weighting applies. Thus, the invention provides a way to calculate the speed of a transition between phonemes in speech recognition based facial animation.

An embodiment of the invention determines the weighting of these parameters (170). A vector is used to define the weights. A target shape, shown by a vector, can comprise a mixture of more than one viseme. If, for example, a weighting for two visemes is set at 0.5 for a first viseme and 0.5 for a second. Then such a viseme is, for example, one-half "ah". A respective weighting of 0.2 and 0.8 means that 80 percent of the viseme is the shape for the phoneme "ah." Thus, this embodiment of the invention moves a vector in the viseme space, i.e. it moves the current viseme point in multidimensional space from a current point to a target facial expression, e.g. "ah" or "ee" or "oo" or "oh."

Key to the invention is limiting the speed and the acceleration at which a facial expression is moved to this current point. In the invention, there is a universe of possible expressions based on phonemes. The vector that moves the face toward these different expressions in a way that allows the transition to be very natural. This is based upon the observation that the face is moved by muscle, which creates force that leads to acceleration.

The following are phonemes that may be represented by visemes: /a/, /i/, /u/, /e/, /o/, closed mouth (C), and common consonant (CC). Table 1 below provides an example of a weighting for the common consonants to form a viseme that provides a facial expression for a closed mouth, and for the /a/ and the /i/ sounds. Other weightings are possible, including those for a viseme or viseme transition comprised of a combination of sounds.

TABLE 1

| Sound | Weighting |
| | C /a/ /i/ /u/ /e/ /o/ CC |
| --- | --- |
| C | (1.0, 0.0, 0.0, 0.0, 0.0, 0.0, 0.0) |
| /a/ | (0.0, 1.0, 0.0, 0.0, 0.0, 0.0, 0.0) |
| /i/ | (0.0, 0.0, 1.0, 0.0, 0.0, 0.0, 0.0) |

Figure 2:
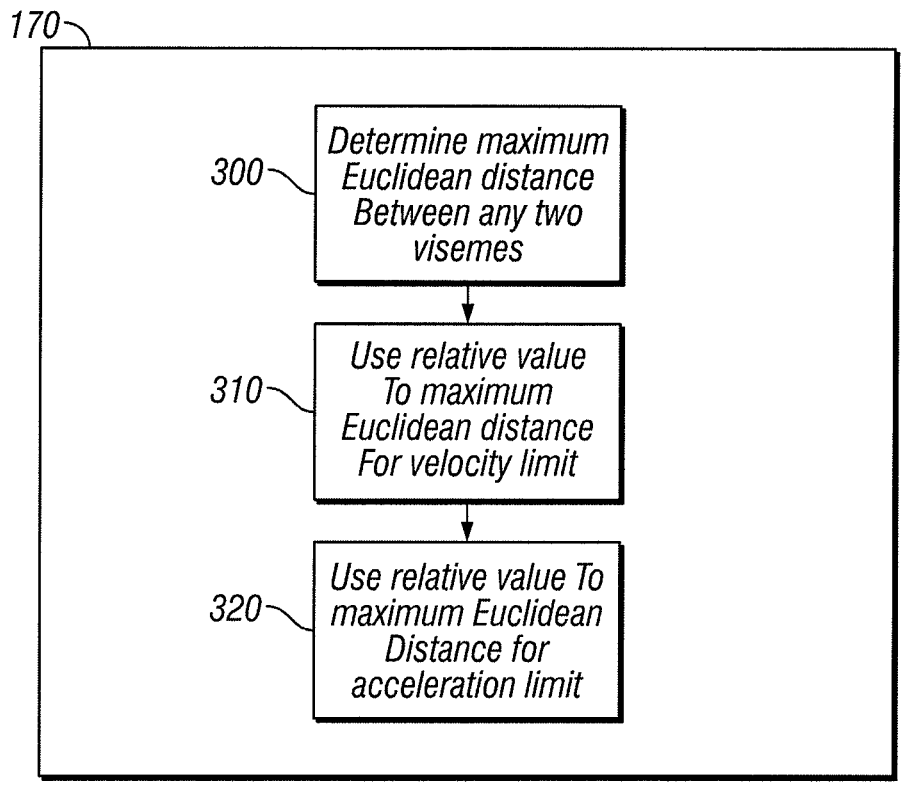
FIG. 2 is a flow diagram showing determination of velocity and acceleration limitations in a facial animation algorithm according to an embodiment of the invention.

FIG. 2 is a flow diagram showing determination of velocity and acceleration limitations (FIG. 1: 170) in a facial animation algorithm according to an embodiment of the invention. In an embodiment, only acceleration is calculated and applied as a vector from a current position, frame by frame. Thus, the acceleration vector is actually the transition, i.e. how quickly the muscles are transitioning. In this embodiment, the relative Euclid distance may be used to calculate the distance of two points (300), i.e. the length of the vector that is used, between any two visemes for a velocity limit (310); likewise, a determination may be made for an acceleration limit (320). This results in a fixed value in one embodiment based upon curve fitting using linear polynomials, e.g. a linear interpolation.

Figure 3:
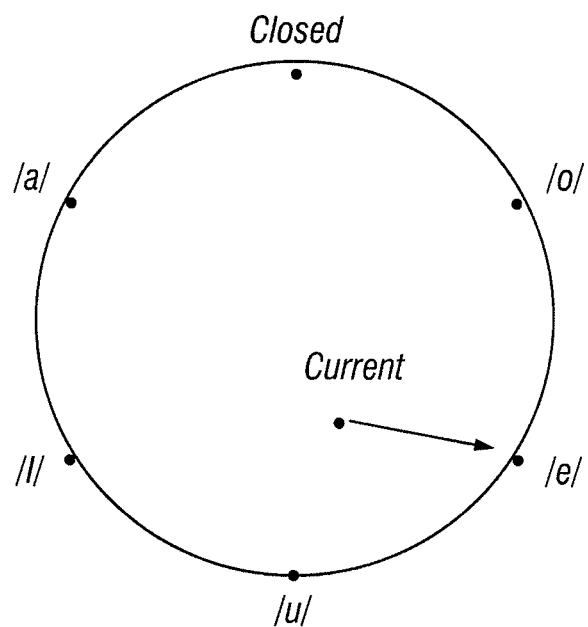
FIG. 3 is a diagram showing a viseme point in multidimensional space according to the invention.

FIG. 3 is a diagram showing a viseme point in multidimensional space according to the invention. As discussed above, in the invention there may be two vectors, i.e. acceleration and velocity. A fixed value is set for maximum velocity, which is a maximum velocity that can be achieved through acceleration, at which point no further velocity is possible. In this way, the face does not move in an unnatural, exaggerated way. For example, when the current point, e.g. the "ee" is nearing to the target, the velocity and the acceleration are set to zero, and this becomes the fixed, current point of the target. When the target in a next frame is, e.g. "ah," then the acceleration and the velocity are modified to get to that point.

Another advantage of the invention is that the transitional phonemes, i.e. noise-trapped phonemes, are muted because the use of vectors adds hysteresis to a viseme-to-viseme transition that tends to pull the face away from these unwanted phonemes as a frame is created. It is not necessary to have a quick transition from one viseme to the other. Rather, the technique herein tends to control such transition. In this example, the "oo" does not have that much effect. It is not able to pull the whole face over to one direction because the "oh" is coming along and starting to pull it back again, and the "oh" has a bigger weighting and is thus counteracting it. If the length of the "oo" frame is longer, it would not make a nice transition, but if it is only one frame, it does not introduce a detracting artifact. Further, because the velocity is controlled, there are no jerky facial movement, i.e. the technique disclosed herein does not allow the transition to occur so quickly that the face looks unnatural, unless that such appearance is actually intended, as in a sudden show of emotion.

In an embodiment, a fixed value may be used for velocity, which is based upon the relative value to the maximum distance between any two visemes. Thus, if the distance between two visemes is the maximum value, then in an embodiment the vector may be divided by, for example, 4.5. This means that it requires 4.5 frames to perform the transition. The vector division factor is determined by such factors as frame rate. Thus, different values are used for different types of animation, e.g. for 24, 25, 30, 50 or 60 frames per second.

In an embodiment, a speech recognition engine provides a time sequence of phonemes, where a phoneme is linked to a final viseme, which defines the shape of a facial expression, e.g. if the expression is "ee," then the screen shows this facial expression. The invention applies velocity and acceleration and limitations to move the expression from one viseme to a next. A calculation is made for the distance between a pair of visemes. The maximum of one of the visemes is divided by a fixed number, which is based upon the frame speed, e.g. 4.5 is used as a velocity limitation and acceleration limitation.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An apparatus for natural inter-viseme animation of a 3D model driven by speech recognition, comprising:
   a speech recognition engine that identifies phonemes in a sequence of speech; and
   a processor programmed to associate the phonemes with corresponding visemes which represent facial expressions in said 3D model;
   said processor programmed to determine and limit any of velocity and acceleration of a normalized parameter vector, the velocity or acceleration occurring in movement from a first one of the visemes to a second one of the visemes;
   said processor programmed to establish and apply a maximum value to the velocity or acceleration to limit the velocity or acceleration, wherein as a distance between the first viseme and the second viseme decreases, the velocity or acceleration decreases from the maximum value to zero.

2. The apparatus of claim 1, said processor programmed to map each element of said parameter vector to animation node outputs of said 3D model based on mesh blending, weighted by a mix of key frames, to effect inter-viseme transitions.

3. The apparatus of claim 1, wherein said processor is configured to generate the limit based on a maximum distance between two of the visemes, the maximum distance being a maximum value of distances between two of the visemes.

4. A computer implemented method for facial animation, comprising the computer implemented steps of:
receiving phonemes in a sequence of speech from a speech recognition engine;
associating at least two of said phonemes with corresponding visemes which represent facial expressions;
defining a viseme weighting parameter vector in which each element stands for a weight of one viseme;
applying said viseme weighting parameter vector to each viseme to limit any of a velocity and acceleration component in connection with a transition from a first one of the visemes to a second one of the visemes; and
establishing and applying a maximum value to the velocity component or acceleration component to limit the velocity component or acceleration component, wherein as a distance between the first viseme and the second viseme decreases, the velocity component or acceleration component decreases from the maximum value to zero.

5. The method of claim 4, further comprising the step of: animating a face with said viseme weighting parameter vector.

6. The method of claim 4, further comprising the step of: representing each element as a weight for a morph when mesh-morphing is used for facial animation.

7. The method of claim 4, further comprising the step of: representing each element as a weight for a plurality of parameters to create a shape of a viseme when bone skinning is used for facial animation.

8. The method of claim 4, further comprising the steps of: calculating the speed of a transition between the visemes in speech recognition based facial animation; and
applying said viseme weighting parameter vector to said transition to maintain said transition speed within a weighted limit established by said viseme weighting parameter vector by any of velocity and acceleration.

9. The method of claim 4, wherein a target facial shape comprises a mixture of more than one viseme.

10. The method of claim 4, further comprising the step of: displaying a viseme for each facial expression that corresponds to each recognized phoneme.

11. The method of claim 10, wherein each said recognized phoneme has a corresponding one of the following visemes: /a/, /i/, /u/, /e/, /o/, closed mouth (C), and common consonant (CC).

12. The method of claim 4, further comprising the steps of: determining any of a velocity and an acceleration weighting; and
applying said weighting as a transition value from a current viseme to a target viseme on a frame by frame basis.

13. The method of claim 12, said acceleration value comprising a weighting for an inter-viseme transition.

14. The method of claim 4, further comprising the step of: using relative Euclid distance to calculate a vector distance between any two of the visemes for any of said velocity component and said acceleration component.

15. The method of claim 4, further comprising the step of: adding hysteresis to a viseme-to-viseme transition with said viseme weighting parameter vector to avoid an influence of unwanted phonemes as a frame is created.

16. The method of claim 4, further comprising the step of: determining a vector division factor based upon an animation frame rate that is associated with the visemes.

17. An apparatus for effecting speech driver facial animation, comprising:
a speech recognition engine that provides a time sequence of phonemes; and
a processor that is programmed to link each phoneme within the sequence to a corresponding viseme to define a shape of a facial expression;
said processor programmed to limit any of a velocity and acceleration during a transition from a first one of the visemes to a second one of the visemes, said processor programmed to establish and apply a maximum value to the velocity or acceleration to limit the velocity or acceleration, wherein as a distance between the first viseme and the second viseme decreases, the velocity or acceleration decreases from the maximum value to zero.

18. The apparatus of claim 17, further comprising:
said processor programmed to calculate a distance between a facial expression displayed by a current viseme and a facial expression displayed by a target viseme;
said processor programmed to generate said weighting by dividing a maximum of said distance by a fixed number which is based upon animation frame speed; and
said processor programmed to apply said weighting as any of said velocity limitation and said acceleration limitation.

19. A computer implemented method for effecting speech driver facial animation, comprising computer implemented operations of:
providing a time sequence of phonemes with speech recognition engine;
linking each phoneme within the sequence to a corresponding viseme to define a shape of a facial expression;
limiting any of a velocity and acceleration during a transition from a first one of the visemes to a second one of the visemes; and
establishing and applying a maximum value to the velocity or acceleration to limit the velocity or acceleration, wherein as a distance between the first viseme and the second viseme decreases, the velocity or acceleration decreases from the maximum value to zero.

20. The method of claim 19, further comprising the steps of:
calculating a distance between a facial expression displayed current viseme and a facial expression displayed by a target viseme;
generating said weighting by dividing a maximum of said distance by a fixed number which is based upon animation frame speed; and
applying said weighting as any of said velocity limitation and said acceleration limitation.

* * * * *